United States Patent [19]

Toman

[11] 4,041,492
[45] Aug. 9, 1977

[54] RADIO NAVIGATION WITH SEPARATE CORRELATED SCANS TO AVOID REFLECTION INTERFERENCE

[75] Inventor: Donald J. Toman, Pleasantville, N.Y.
[73] Assignee: Tull Aviation Corporation, Armonk, N.Y.
[21] Appl. No.: 668,696
[22] Filed: Mar. 19, 1976
[51] Int. Cl.² .......................... G01S 1/54; G01S 1/16
[52] U.S. Cl. ............................ 343/106 R; 343/108 M
[58] Field of Search ...................... 343/108 M, 106 R
[56] References Cited
U.S. PATENT DOCUMENTS 2,112,283 3/1938 Fritz ................................. 343/106 R
3,757,337 9/1973 Litchford ......................... 343/106 R Primary Examiner—Maynard R. Wilbur
Assistant Examiner—Richard E. Berger
Attorney, Agent, or Firm—Curtis Ailes

[57] ABSTRACT

Where a signal reflective fixed obstruction is present in a subsector of a navigation angle sector in which guidance is required, scanning beams are employed including a main scan which is scanned over most of the navigation angle sector and an auxiliary scan which is scanned only over the obstruction subsector. The scan signals are received and correlated by the aircraft to distinguish obstruction subsector signals to thereby avoid reflection interference.

15 Claims, 3 Drawing Figures

RADIO NAVIGATION WITH SEPARATE CORRELATED SCANS TO AVOID REFLECTION INTERFERENCE

This invention relates to radio navigation systems employing directional radio signals, and more particularly, to guidance systems which are especially useful for landing aircraft.

In radio navigation systems employing directional radio signals, obstructions which reflect the directional signals create serious problems because the aircraft receivers are often incapable of distinguishing the reflected signals from the signals received directly, and the reflected signals present erroneous information to the aircraft receiver. This problem is encountered, for instance, in azimuth or elevation navigation position indication apparatus where there may be a signal reflective obstruction which is permanently located in a subsector of the signal path.

Accordingly, it is an important object of the present invention to provide a method of transmission of angle information signals, and of processing those signals, to overcome the problems created by a signal reflective obstruction in a sub-sector of the navigation signal section in which signals are desired.

One proposed solution for the above mentioned problem has been to simply blank out the transmission of navigation signals in the sub-sector of the signal path occupied by the reflective obstruction. This measure alone does solve the problem of avoiding reflections to receivers located outside of the obstruction sub-sector. However, it leaves aircraft receivers which may be in the obstruction sub-sector without any guidance signal whatever, a result which is generally undesirable because of the resultant ambiguity. Thus, the operator of the aircraft does not know for sure whether his receiver is operating correctly, or whether he may be too far from the transmitter to receive a correct signal, or whether he is actually in the blanked-out obstruction sub-sector.

Accordingly, it is another important object of the present invention to provide a method of transmission of angle information signals and of processing those signals to overcome the problems created by a signal reflected obstruction in a sub-sector, while at the same time providing for unambiguous guidance information signals to an aircraft receiver located within the obstruction sub-sector.

Further objects and advantages of the invention will be apparent from the following description and the accompanying drawings.

The invention may be carried out by a method for providing navigation signals for aircraft over a full navigation angle sector in the presence of a signal-reflective fixed obstruction within a sub-sector of the navigation sector while avoiding the consequences of reflected signal interference therefrom comprising transmitting radio energy containing navigation information in a directional beam which is scanned in a main scan over said navigation sector, and separately transmitting radio energy containing navigation information in a directional beam which is scanned in an auxiliary scan only over said obstruction sub-sector while transmitting auxiliary scan identifying information to distinguish the auxiliary scan from the main scan to thereby provide information sufficient for a receiver within said navigation sector to distinguish true signals from signals reflected from the signal reflective obstruction.

The invention is useful either for azimuth (localizer), or elevation (glide slope) guidance. However, it is believed to be particularly useful for azimuth guidance and is particularly described below in terms of an azimuth guidance system. It will be understood that the same principles are applicable to elevation (glide slope) systems.

Figure 1:
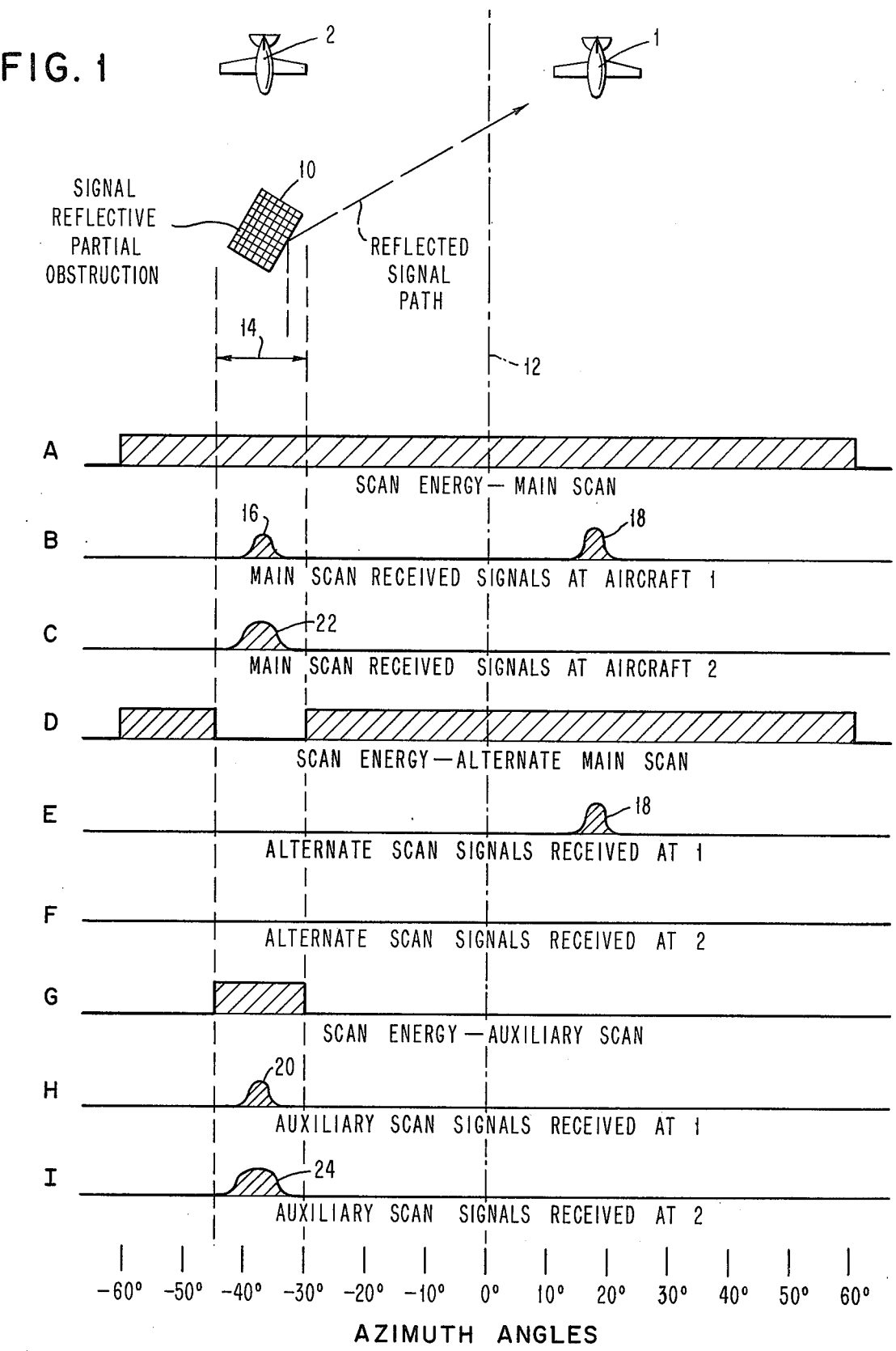
FIG. 1 is a schematic representation of the signal sector, represented in polar coordinates, and showing the various scan signals transmitted to, and received by, aircraft receivers at different positions within the signal sector.

Referring more particularly to FIG. 1 of the drawing, the two aircraft 1 and 2 are shown at different angular positions at the top of the figure. The scale of azimuth angles is given at the bottom of the figure, and is common for the entire figure. The total navigation angle sector is illustrated as extending from −62° to +62° with respect to a center line 12.

A signal reflective partial obstruction 10 is illustrated as fixed within a part of the total navigation angle sector. The obstruction 10 extends sub-sector 14, hereinafter referred to as the "obstruction sub-sector," within the total navigation angle sector. The obstruction 10 may consist of a building, or other man-made structure, or a natural feature of the terrain, such as a rock formation, which is difficult or uneconomical to remove or relocate.

From a ground station, radio energy containing navigation information is transmitted in a directional beam which is scanned in a main scan which may be substantially uniform in energy content over the entire sector from −62° to +62°, as illlustrated in curve A. These scanning signals, and the others discussed below, may be transmitted in various ways. However, a preferred mode of transmission is by the use of reciprocal scanning including "to" and "fro" scans, and by a measurement of the interval between resultant signals at the receiver as an indication of angular position. This system of scanning is disclosed for instance in connection with FIG. 7 of U.S. Pat. No. 3,757,337 issued Sept. 4, 1973 on an invention by George Lichford entitled "Aircraft Instrument Landing System."

As a result of the main scan schematically illustrated by curve A, an aircraft 1 located outside of the obstruction sub-sector 14 may receive signals as indicated by the curve B, including a reflected signal pulse 16 falsely indicating a possible position within the obstruction sub-sector 14, and a pulse 18, correctly indicating the angular position of the aircraft. It will be understood that the pulses 16 and 18 are only schematically illustrated. For instance, if the to and fro scanning mode described above is employed, there are two sets of such pulses, one set being generated on the to scan and the other set generated on the fro scan. The receiver is effective to interpret the time spacing between the respective pulses in the respective scans to thereby measure the angular positions indicated by the pulses. This simplification is followed with respect to all of the transmitted and received scan signals described in connection with the drawing.

In accordance with this invention, an auxiliary beam scan of radio energy is also provided in accordance with the curve indicated at G, in which energy is emitted only in the obstruction sub-sector 14. The auxiliary scan may be carried out simultaneously with the main scan, employing a different radio frequency. However, it is preferred to use a time duplexing scheme in which the main scan and the auxiliary scan time share the same carrier frequency at different time intervals. In either case, information is transmitted in conjunction with the auxiliary scan to distinguish the auxiliary scan from the main scan. Where the auxiliary scan is at a different carrier frequency, that different frequency serves to distinguish the auxiliary scan from the main scan. However, where there is time sharing of the same carrier frequency, the different scans can be identified by different marker modulation frequencies applied to the carrier frequency during the different scans. This is the arrangement used for identification of different scans in the system disclosed in the above-mentioned Lichford patent. However, it is preferred, in accordance with the present invention, where there is time sharing of the same carrier frequency, to transmit a separate identification of the auxiliary scan in a separate time interval, preferably just before the auxiliary scan, in order to identify the auxiliary scan. Since there may also be other time shared functions, it is preferred also to transmit a separate identification of the main scan. The identification signals are transmitted over the entire sector in a non-scanning mode by an antenna which is omnidirectional within the sector. The identification signals may preferably take the form of digital "phase reversal" modulation of the same carrier used for the scanning beams. This signal format (including the to and from scan) has been proposed for use in a new microwave landing system which is presently under development by the U.S. Federal Aviation Administration of the Department of Transportation. The proposed new system is described in various publications, including a report dated December 1975 entitled "Time Reference Scanning Beam Microwave Landing System" issued by U.S. Department of Transportation, Federal Aviation Administration and submitted to the International Civil Aviation Organization. This report is hereinafter referred to simply as "the FAA report."

Curve H in the drawing shows the auxiliary scan signal 20 which is reflected by the obstruction 10 and received at aircraft 1. This information, together with the main scan information previously received by the aircraft 1, as shown at curve B, tells the aircraft receiver that both of the signals 16 and 20 received from the obstruction sub-sector 14 are false (reflected) signals, and that the signal pulse indicated at 18 in curve B is the only true position signal. Thus, the combination of the main scan signals 16 and 18, and the auxiliary scan signal 20 provide the receiver with the means for distinguishing the true signal 18 from the reflected signal 16 in curve B.

Typically, the obstruction 10 is only a partial obstruction which is of limited total height. Thus, an aircraft 2 which is in line with the obstruction sub-sector 14, but above the obstruction 10, is in a position to directly receive signals in the obstruction sub-sector 14. Thus, curve C shows the main scan signal 22 received at aircraft 2. Because of the presence of obstruction 10, the quality of this signal may not be as good as the quality of the true position signal 18 of curve B received by aircraft 1. However, it is a signal which correctly shows that the aircraft 2 is within the obstruction sub-sector 14. Furthermore, as shown by curve I, the auxiliary scan results in a similar signal 24 received at aircraft 2. The presence of both of these signals 22 and 24, and the concurrent absence of any signal at another angular position, such as signal 18 in curve B, confirms that the true position of aircraft 2 is within the obstruction sub-sector 14.

In an alternate form of the invention, which is actually the preferred form, the scan energy of the main scan shown in curve D differs by the complete elimination, or substantial attenuation, of the scan energy in the obstruction sub-sector 14. The result is that, as shown at curve E, no main scan signal 16 is reflected from the obstruction 10 and none is received at aircraft 1. Only the true signal 18 is received. With this modification, since there is no ambiguity in the signal received at aircraft 1, it is not necessary for aircraft 1 to deal with the auxiliary scan signal (curve H) in order to resolve an ambiguity. However, if an aircraft is within the obstruction sub-sector 14, as indicated for aircraft 2, the alternate main scan does not provide any curve C signal 22 to the aircraft, as indicated at curve F. Accordingly, the receiver at aircraft 2 must look at the auxiliary scan (curve I) to confirm that it is indeed within the obstruction sub-sector 14 by receipt of signal 24.

Thus, with the combination of main scan and auxiliary scan, whether the main scan A is employed, or the alternate main scan D is employed, each aircraft receives a true and unambiguous set of information about its angular position with respect to the ground-based transmitter. The aircraft 1 represents any aircraft at any position outside of the obstruction sub-sector 14. It will be understood that the signal reflected from the obstruction 10 may not be as strong in some positions, as in others, and may not be as strong in any position as illustrated in the drawings. The strength of the reflected signal is exaggerated for purposes of analysis.

As briefly indicated above, the alternative main scan (curve D), with the resultant received signals, as shown by curves E and F, is the preferred form of the invention. Since reflections of the alternate main scan signals from obstruction 10 are completely avoided, the signals received by the aircraft 1 are much more simple, and are more easily decoded.

The quality of the signals received by the aircraft 2, which is positioned within the obstruction sub-sector, is limited to some extent by the presence of the obstruction. However, the signal does have some qualitative aspects. Thus, the signal provides some indication of the position of the aircraft within the sub-sector. Generally, the sub-sector will not be at the center-line of the recommended path for the aircraft. Thus, the signal received by the aircraft 2 will generally indicate to the aircraft operator that the aircraft should change its heading to fly closer to the center-line 12 of the guidance sector. The aircraft will then leave the obstruction sub-sector, and will then receive the better quality signals from the main scan outside the obstruction sub-sector.

It will be appreciated that the dimensions between the obstruction 10 and the aircraft 1 and 2 are greatly foreshortened in the drawing. Thus, there is a considerable distance to be traveled by each aircraft in its landing approach after it begins to receive guidance signals from the system.

While the above description deals with only one obstruction, and one corresponding obstruction sub-sector, it is apparent that the principles of the invention can be applied in situations where more than one reflective obstruction is encountered. In each instance, a single auxiliary scan is sufficient to enable an aircraft which is outside any of the obstruction sub-sectors to distinguish true signals from reflected signals. However, a separate auxiliary scan is necessary for each obstruction sub-sector in order to provide completely unambiguous information to each aircraft which may be positioned within an obstruction sub-sector.

All of the above description and explanation assumes that aircraft 2 is situated within the obstruction sub-sector 14 slightly above the obstruction 10, or that the obstruction 10 is not completely opaque or reflective with respect to scanning signals in sector 14 impinging upon the obstruction 10. In such situations, the signals are merely attenuated, and possibly distorted, for the aircraft 2. However, it will be understood that if the aircraft 2 is positioned directly in line with the radiation source on the side of the obstruction 10 opposite to the source, and if the obstruction 10 is completely opaque or reflective, then the aircraft 2 will not receive any signals at all, on either the main or auxiliary scans. However, this condition would be unusual for any obstruction permitted to exist at an aircraft landing facility.

Another important advantage of the invention is in the provision of near field guidance in the range from the transmitter out of the reflective obstruction 10. When the alternate main scan (curve D) is employed, and there is substantially no main scan signal energy in the obstruction sub-sector 14, an aircraft located within that sub-sector, and between the transmitter and the obstruction 10, receives virtually no signal. Accordingly, the auxiliary scan provides a signal for such an aircraft, with the attendant guidance provided by that signal. In the near field, the auxiliary scan signals are substantially the same as previously explained for aircraft 2 in the far field. However, they are more accurate since they are undistorted by the intervention of the obstruction 10.

The provision of near field coverage is especially important when the invention is used for elevation (glide slope). In such an arrangement, the signal reflective obstruction may be a hill, or a building on the horizon beneath the glide path. The obstruction sub-sector is then the lowermost sub-sector of the entire navigation angle sector, and the auxiliary scan signal which is most desired is the near field guidance signal provided by the auxiliary scan in the lowermost sub-sector of the navigation sector in order to provide reliable "fly-up" guidance signals to an aircraft which may fall below the glide path and into the blanked out part of the main scan.

While the invention is described in terms of the worst case, in which there is substantial reflection from the obstruction 10 to the aircraft 1, giving rise to the signal 16 in curve B, it will be understood that this condition will vary, even at landing sites where there is a substantial obstruction, so that at some of the possible positions of the aircraft 1, there will be little or no reflected signal 16 received at the aircraft even when main scan energy is substantially uniform over the entire navigation sector, as illustrated in curve A. Accordingly, the receiver of the aircraft will recognize the single 18 (curve B) as being a true signal, in the absence of the reflected signal 16. However, this again illustrates the greater simplicity of the receiver which is possible when the alternate main scan (curve D) is used because there is then no reflected signal 16 at any position of the aircraft 1.

Figure 2:
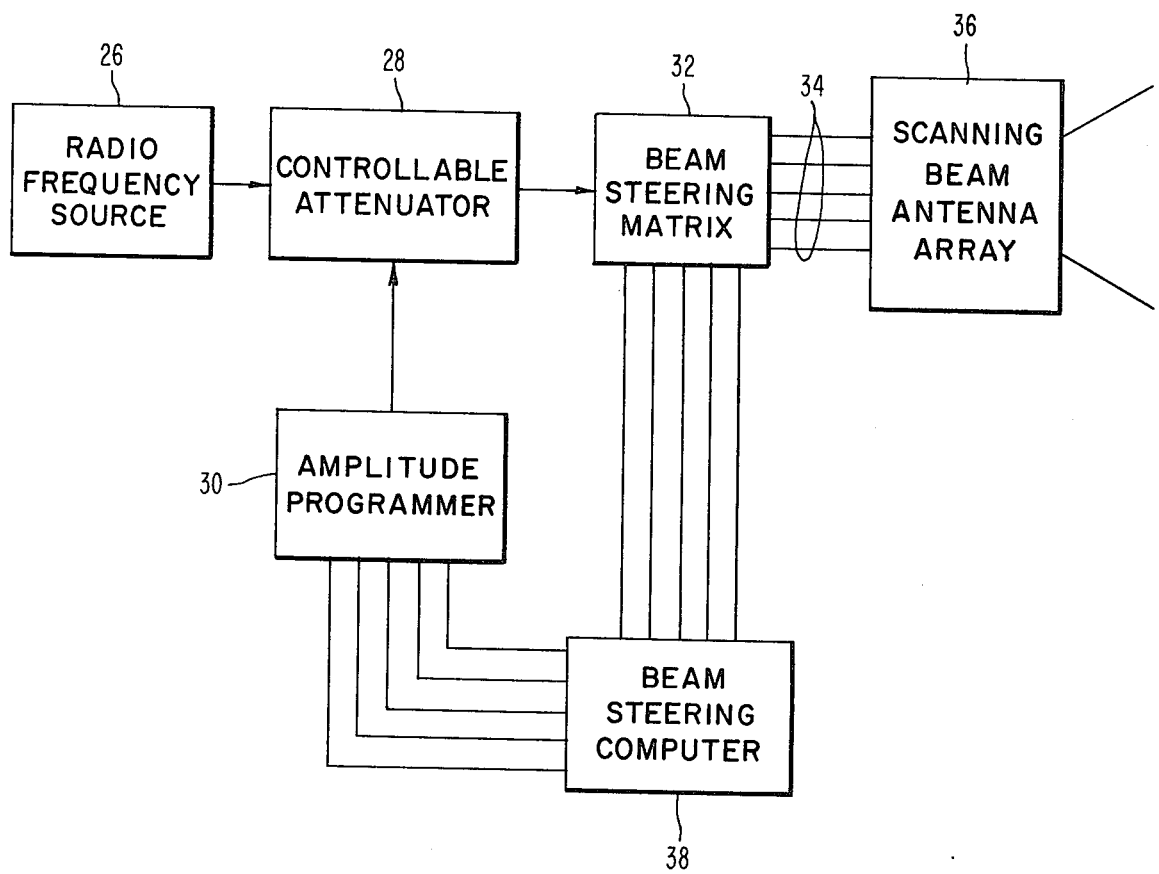
FIG. 2 is a schematic diagram of a transmitter for carrying out the invention.

FIG. 2 is a schematic representation of a transmitter which is capable of generating signals described above in connection with FIG. 1. The basic carrier frequency signals are obtained from a radio frequency source 26, and are supplied to a controllable attenuator 28 which controls the signal amplitude in accordance with signals from an amplitude programmer 30. The signal passed by the controllable attenuator then goes to the beam steering matrix 32 which carries separate signal components selectively through the multiple connections 34 to a scanning beam antenna array 36 which emits the scanning beam signals. The beam steering matrix 32 and the amplitude programmer 30 are both controlled by a beam steering computer 38 through the multiple connections shown from computer 38 to the programmer 30 and the steering matrix 32.

The beam steering matrix 32, operating under control of the beam steering computer 38, determines the time versus scan operation of the beamed radio frequency energy. The amplitude programmer 30, operating through the controllable attenuator 28, determines the energy amplitudes at different scan intervals and provides for the "blanking out" of the alternate main scan (curve D), for instance, during the scans through the obstruction sub-sector 14. It also determines the pattern of energy radiation for the auxiliary scan (curve G) in which energy is radiated only during the scans through the obstruction sub-sector 14. The details of the transmitter are preferably carried out in accordance with the teachings of the above-mentioned FAA report.

Figure 3:
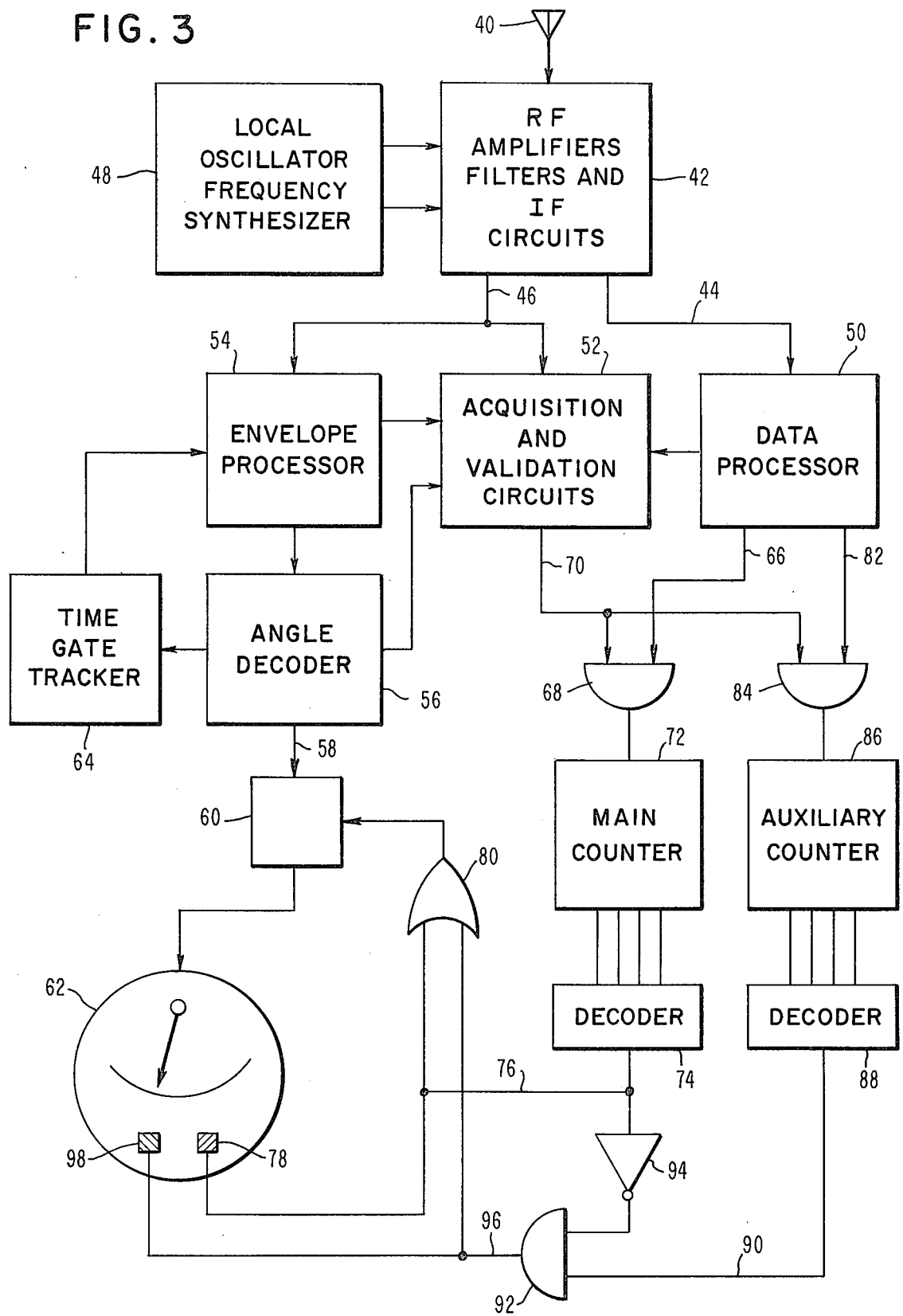
FIG. 3 is a schematic diagram illustrating a receiver used in carrying out the invention.

FIG. 3 is a schematic representation of a preferred form of receiver for carrying out the invention.

The receiver includes an antenna schematically shown at 40 which receives the scanning beam signals, which are transmitted preferably at C-band microwave frequencies. Antenna 40 supplies those signals to the early stages of the receiver indicated at 42, which include radio frequency amplifiers, filters, and intermediate frequency circuits. These circuits amplify the received signal, filter out unwanted adjacent signals, and convert the microwave signal to an intermediate frequency signal at connection 44, and a "video" signal 46. A local oscillator frequency synthesizer is provided, as indicated at 48, which supplies local oscillator frequencies to the mixers within 42 for accomplishing the frequency conversions.

The intermediate frequency signal on connection 44 is supplied to a data processor circuit 50 which detects and decodes the digital parts of the signals, usually consisting of the digital preamble to each set of navigation signals.

The video signal is supplied on connection 46 to the acquisition and validation circuits 52 and to the enveloped processor 54. The acquisition and validation circuits 52 assess the quality of the navigation signal and thereby determine whether or not the resulting data is to be displayed and used. The envelope processor 54 precisely determines when the to and fro beams scan by the aircraft. The resultant signals are supplied to an angle decoder 56 which determines azimuth or elevation angles based upon the time interval between the to and fro scans. Such angle determination signals appear at the output 58, and are ultimately gated, such as through the gate 60 to indicators or angle data utilization devices, such as the navigation azimuth angle indicator shown at 62.

The time gate tracker circuit 64, which is connected between the angle decoder 56 and the envelope processor 54 designates which of the to and fro scans are to be processed.

All of the circuits of FIG. 3 described above are preferably used in common for a number of different navigation information signal functions, including the main scan and the auxiliary scan in accordance with the present invention.

Consistent with the earlier description of the invention, it will be assumed that the invention is embodied in an azimuth (localizer) guidance system, with a main azimuth scan sequence and an auxiliary azimuth scan sequence. Furthermore, the receiver embodiment of FIG. 3 is based upon the use of the so-called alternate main scan illustrated in FIG. 1 curve D which was explained as the preferred main scan. This is the main scan sequence in which the beam energy is substantially attenuated in the obstruction sub-sector 14.

When the main azimuth scan group of to and fro scans is detected by the data processor 50 by means of the digital data preamble accompanying those scans, a resultant signal appears at the data processor output connection 66 to a logic AND gate 68. When the acquisition and validation circuits 52 determine that all of the other condition necessary for valid reception of data exist on a particular main localizer data cycle, an output signal appears on connection 70, providing a second input to the AND gate 68, causing the delivery of a signal from that AND gate to a counter 72. The data cycles are repeated in a sequence, over and over, and include interspersed data scans for different functions. However, an entire series of data cycles is repeated with considerable rapidity, with one main localizer scan included in each series. The reliability of the data is checked a number of times, on a number of separate localizer main scan cycles so as to increment the count stored in the main counter 72 up to a level above a predetermined count, before the guidance information is actually used. When that count, or any count above that level, is achieved, it is detected by a decoder 74 which provides an output at connection 76. The resultant output signal at connection 76 operates visible flag device 78 which forms a part of the navigation indicator 62, and tells the pilot of the aircraft that true data is available. The signal on connection 76 from the decoder is also supplied through an OR gate 80 to open the gate 60 to allow the navigation information from the angle decoder 56 to be supplied to the indicator 62.

If the aircraft is too far away from the ground station to receive navigation signals of sufficient strength, the acquisition and validation circuits will not increment the counter 72, and the flag 78 will not be operated so that the pilot will know that he does not have reliable navigation information. If the signals are marginal, and fading in and out, so that the counter 72 is incremented occasionally, but not consistently, the counter 72 will never reach the required count because the counter 72 is automatically counted down from time to time to keep marginal signals, which are only occasionally validated, from being used.

If the aircraft is in the obstruction sub-sector, where the main scan is blanked out, there will be substantially no main scan signal, and the counter 72 will not indicate a validated main scan signal.

The auxiliary scan occurs on a separate scan cycle, and is similarly detected by the data processor and indicated on a connection 82 to an AND gate 84 which feeds into an auxiliary scan cycle counter 86. Again, if the acquisition and validation circuits detect a valid signal, a resultant second signal is supplied to gate 84 from connection 70, thus incrementing the auxiliary counter 86. Again, when a sufficient number of repeated validations of the signal occur, the auxiliary counter 86 counts up to a value which is detected by the decoder 88, providing an output on connection 90 to an AND gate 92. The other input of AND gate 92 is supplied from the decoder 74 through an inverter 94. Thus, gate 92 is opened only in the absence of a validated main scan count level sufficient for indication by the decoder 74. When this condition exists, AND gate 92 provides an output signal at connection 96 to activate an auxiliary scan flag 98 on the navigation information indicator 62 to indicate to the pilot that valid auxiliary scan information is available to him. The signal from connection 96 is also supplied through the OR gate 80 to open the gate 60 to permit the navigation information to be supplied to the indicator 62.

It will be appreciated from the above explanation that, if the aircraft is in the obstruction sub-sector 14 of FIG. 1, as illustrated for aircraft 2 in that figure, and if the obstruction of the signals is not complete, the aircraft will receive auxiliary scan signals, and will not receive main scan signals. Thus, the logic requirements for AND gate 92 will be satisfied, and the pilot will receive valid auxiliary scan information on the navigation indicator 62.

On the other hand, if the aircraft is in another part of the navigation sector, such as the aircraft 1 in FIG. 1, then valid main scan navigation signals will be received and appropriately indicated on the indicator 62, with actuation of the flag 78. Under these circumstances, even if the auxiliary signals reflected by the obstruction are strong enough to cause a counting up of the auxiliary counter 86 to the required level, the combination of the inverter 94 and the AND gate 92 will block the concurrent operation of the auxiliary flag 98 and the transmission of auxiliary navigation angle information to the indicator 62 through gate 60.

While not illustrated, it will be understood that appropriate time gating is required for gate 60 in order to permit opening of that gate only during main azimuth scan cycles or auxiliary azimuth scan cycles, so that the other components of the circuit can be used for other navigation functions during other cycles of each series. It will be understood also that suitable signal storage means may be provided for the indicator 62 in order to store the navigation information between localizer cycles.

The details of the construction of the receiver illustrated in FIG. 3 are preferably carried out in accordance with the teachings of the FAA report. Attention is particularly directed to the information appearing on pages 1-2.194 through 1-2.208 of that report.

The receiver of FIG. 3, as described, is capable of handling only the preferred alternate main scan signals illustrated in curves D, E and F of FIG. 1. The same principles illustrated in the receiver of FIG. 3 can be used, with additional logic, to process the main scan signals illustrated in curves A, B and C of FIG. 1.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method for providing navigation signals for aircraft over a full navigation angle sector in the presence of a signal-reflective fixed obstruction within a sub-sector of the navigation sector while avoiding the consequences of reflected signal interference therefrom, comprising transmitting radio energy containing navigation information in a directional beam which is scanned in a main scan over said navigation sector.

and separetly transmitting radio energy containing navigation information in a directional beam which is scanned in an auxiliary scan only over said obstruction sub-sector while transmitting auxiliary scan identifying information to distinguish the auxiliary scan from the main scan to thereby provide information sufficient for a receiver within said navigation sector to distinguish true signals from signals reflected from the signal reflective obstruction.

2. A method as claimed in claim 1, wherein the information transmitted to an aircraft receiver by both of said scans is correlated to recognize that an auxiliary scan navigation signal received in the absence of a main scan navigation signal indicating an angular position outside of said obstruction sub-sector confirms a position of the aircraft receiver within said obstruction sub-sector.

3. A method as claimed in claim 1, wherein information to distinguish the main scan from the auxiliary scan is transmitted in conjunction with said main scan directional beam.

4. A method as claimed in claim 3, wherein said auxiliary scan identifying information and said main scan identifying information is transmitted in the form of time duplexed signals carried by a common carrier frequency used to transmit said main scan and auxiliary scan directional beams.

5. A method as claimed in claim 4, wherein said identifying information for said main scan and for said auxiliary scan is transmitted in a non-scanning mode over the full navigation sector by digital modulation of the radio frequency carrier.

6. A method as claimed in claim 1, wherein said main scan directional beam and said auxiliary scan directional beam are both carried out by reciprocal to and fro scans with a time measurement between received signals being used to indicate angle information.

7. A method as claimed in claim 1, wherein the energy of said main scan is substantially attenuated in said obstruction sub-sector in order to avoid reflected signals from said signal reflective obstruction during the main scan and so that no appreciable main scan signal is received by an aircraft receiver positioned in the obstruction sub-sector.

8. A method as claimed in claim 1, wherein the energy of the main scan is maintained at full power during the entire main scan including said obstruction sub-sector, and wherein the condition when an aircraft is positioned outside the obstruction sub-sector is detected by discounting a signal reflected from said signal reflective obstruction during said main scan when a true position signal is present resulting from said main scan and showing a position outside of said obstruction sub-sector.

9. A method as claimed in claim 6, wherein the scanning beams are transmitted at microwave frequencies and the to and fro scans are carried out by scanning in azimuth to provide azimuth navigation angle information.

10. A method as claimed in claim 6, wherein the scanning beams are transmitted at microwave frequencies and the to and fro scans are carried out by scanning in elevation to provide elevation navigation angle information.

11. A navigation aid transmitter for providing navigation signals for aircraft over a full navigation angle sector in the presence of a signal-reflective fixed obstruction within a sub-sector of the navigation sector while avoiding the consequences of reflected signal interference therefrom, comprising means for transmitting radio energy containing navigation information in a directional beam which is scanned in a main scan over all portions of said navigation sector except for said obstruction sub-sector, means for separately transmitting radio energy containing navigation information in a directional beam which is scanned in an auxiliary scan over said obstruction sub-sector, said main scan transmitting means being operable to transmit said main scan in the form of a pair of to and fro scans and said auxiliary scan transmitting means being operable to transmit said auxiliary scan in the form of a separate pair of to and fro scans at a time different from said main scan to and fro scans so that one of said pairs of to and fro scans is completed before the other pair of said to and fro scans is started, and means for transmitting auxiliary scan identifying information in the form of separate time duplexed signals transmitted at the same carrier frequency as used for said auxiliary scan to distinguish the auxiliary scan from the main scan.

12. Apparatus for providing navigation signals for aircraft over a full navigation angle sector in the presence of a signal-reflective fixed obstruction within a sub-sector of the navigation sector while avoiding the consequences of reflected signal interference therefrom, comprising means for transmitting radio energy containing navigation information in a directional beam which is scanned in a main scan over said navigation sector, means for separately transmitting radio energy containing navigation information in a directional beam which is scanned in an auxiliary scan over said obstruction sub-sector while transmitting auxiliary scan identifying information to distinguish the auxiliary scan from the main scan, an aircraft receiver, and means within said aircraft receiver for correlating the information transmitted to said aircraft receiver by both of said scans to recognize that an auxiliary scan navigation signal received in the absence of a main scan navigation signal indicating an angular position outside of said obstruction sub-sector confirms a position of the aircraft receiver within said obstruction sub-sector.

13. Apparatus as claimed in claim 12, wherein said correlating means is operable to confirm a position within said obstruction sub-sector only after a plurality of auxiliary scan navigation signals are received and stored on separate scan cycles to thereby validate the auxiliary scan signals.

14. Apparatus as claimed in claim 12 including indicating means connected to said correlating means for indicating to the aircraft operator when the receiver is in said obstruction sub-sector.

15. Apparatus as claimed in claim 14 including a separate indicating means connected to indicate the presence of a main scan signal outside of said obstruction sub-sector.

* * * * *

UNITED STATES PATENT AND TRADEMARK OFFICE
CERTIFICATE OF CORRECTION

PATENT NO. : 4,041,492
DATED : Aug. 9, 1977
INVENTOR(S) : Donald J. Toman

It is certified that error appears in the above-identified patent and that said Letters Patent are hereby corrected as shown below:

```
Column 1, lines 25 & 26, "section" should read --sector--
          line 46, "reflected" should read --reflective--
Column 2, line 29, "extends" should read --subtends a--
Column 3, line 34, "from" should read --fro--
Column 5, line 28, "of" should read --to--
Column 6, line 44, before "46" insert --at--
Column 7, line 26, "condition" should read --conditions--
Column 9, line 13, "separetly" should read --separately--
```

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*